(12) United States Patent
Bayon et al.

(10) Patent No.: US 8,314,184 B2
(45) Date of Patent: Nov. 20, 2012

(54) LIQUID SILICONE ELASTOMER COMPOSITION FOR MATERIAL HAVING HIGH TEAR STRENGTH

(75) Inventors: Lorrène Bayon, Lyons (FR); Christian Koelblin, Meximieux (FR)

(73) Assignee: Nexans, Paris (FR)

( * ) Notice: Subject to any disclaimer, the term of this patent is extended or adjusted under 35 U.S.C. 154(b) by 800 days.

(21) Appl. No.: 11/660,191

(22) PCT Filed: Aug. 30, 2005

(86) PCT No.: PCT/FR2005/050692
§ 371 (c)(1),
(2), (4) Date: Jul. 2, 2007

(87) PCT Pub. No.: WO2006/027525
PCT Pub. Date: Mar. 16, 2006

(65) Prior Publication Data
US 2008/0045648 A1    Feb. 21, 2008

(30) Foreign Application Priority Data
Aug. 30, 2004  (FR) .................................. 04 51931

(51) Int. Cl.
*C08L 43/04*  (2006.01)
(52) U.S. Cl. .................. 525/105; 525/478; 524/588

(58) Field of Classification Search ................ 524/492, 524/588; 525/105, 478
See application file for complete search history.

(56) References Cited

U.S. PATENT DOCUMENTS

| | | | | |
|---|---|---|---|---|
| 3,433,760 A * | 3/1969 | Clark et al. | ................... | 524/780 |
| 4,701,503 A | 10/1987 | Sato | ............................. | 525/478 |
| 5,010,137 A * | 4/1991 | Umeda et al. | ................. | 525/104 |
| 5,295,525 A * | 3/1994 | Sanda, Jr. | ...................... | 152/503 |
| 5,656,690 A | 8/1997 | Pradl et al. | .................... | 524/847 |
| 6,476,123 B1 | 11/2002 | Morita et al. | ................. | 524/837 |
| 6,875,534 B2 * | 4/2005 | Nakamura et al. | ............ | 429/492 |
| 7,026,399 B2 * | 4/2006 | Kim et al. | ..................... | 525/100 |
| 2003/0045615 A1 | 3/2003 | Nakamura et al. | ............ | 524/261 |
| 2004/0063803 A1 * | 4/2004 | Kim et al. | ........................ | 522/1 |
| 2006/0217018 A1 * | 9/2006 | Parker | ............................ | 442/59 |

OTHER PUBLICATIONS

International Search Report—Feb. 6, 2006.

* cited by examiner

*Primary Examiner* — Margaret Moore
(74) *Attorney, Agent, or Firm* — Sofer & Haroun, LLP

(57) ABSTRACT

The present invention relates to a liquid silicone elastomer composition comprising an unsaturated polyorganosiloxane having at least two unsaturated bonds, a hydrogenopolyorganosiloxane having at least two silicon-hydrogen bonds, a hydrosilylation catalyst, and silica. The invention is remarkable in that the composition further comprises an unsaturated organic polymer having at least two unsaturated bonds, and a cross-linking agent specific to said unsaturated organic polymer.

26 Claims, 2 Drawing Sheets

LIQUID SILICONE ELASTOMER COMPOSITION FOR MATERIAL HAVING HIGH TEAR STRENGTH

RELATED APPLICATIONS:

The present application is a National Phase application of PCT/FR2005/050692, which in turn claims the benefit of priority from French Patent Application No. 04 51931, filed on Aug. 30, 2004, the entirety of which are incorporated herein by reference.

FIELD OF THE INVENTION

The present invention relates to a cross-linkable composition based on liquid silicons elastomer, for use in fabricating a material having high tear strength.

The invention finds a particularly advantageous, but non-exclusive application in the field of electric power accessories, such as termination elements or junction elements for power cables.

BACKGROUND OF THE INVENTION

Liquid silicone elastomers, commonly referred to as liquid silicon rubbers (LSR) are mixtures essentially made up of a polyorganosiloxane having at least two unsaturated bonds, a hydrogenopolyorganosiloxane having at least two silicon-hydrogen bonds, and a hydrosilylation catalyst. It should be observed that compositions of this type also generally contain silica in order to give a certain amount of cohesion to the final material, it being understood that cross-linked silicones intrinsically present a consistency that is somewhat pasty or even oily in the normal, non-cross-linked state.

In any event, silicone elastomers are known for providing excellent resistance to high temperatures and to bad weather, together with good insulating properties. However that type of material also presents the drawback of presenting only poor tear strength, in particular in comparison with natural and synthetic rubbers which are themselves mostly constituted by a carbon backbone. In practice, this tear characteristic raises a genuine problem when silicone elastomers are for use in making embodiments that are likely to be handled. This applies specifically to applications of the electric power accessory type.

Nevertheless, various technical solutions exist for increasing the tear strength of materials based on liquid silicone elastomers.

The first consists in using large quantities of silica filler. However because of the thickening properties of compounds of that type, there often occurs an undesirable increase in the viscosity of the composition, which can even lead to the material hardening. The liquid silicone elastomer can thus become incompatible with a low-pressure injection method, which is a technique used for working this type of material. Increasing the silica content within the liquid silicone elastomer composition also has the consequence of degrading some of the electrical properties of the cross-linked material, in particular its resistance to arcing and its resistance to creepage or trapping.

The tear strength of silicone elastomers can also be increased by using long polysiloxane chains, since they are capable of providing greater functionality specifically because of their greater dimensions and thus a greater density of cross-linking. However, as with the first solution, this leads quickly to a significant increase in viscosity, or even to an increase in the hardness of the cross-linked material.

A third known solution enables all of those recurrent drawbacks to be avoided. It consists in adding a polymer to the liquid silicone elastomer composition, such as a polyamide, a polyethylene, or an EPDM, in association with one or more coupling agents. Although that type of solution does indeed enable the tear strength of the material to be increased, it nevertheless presents the drawback of being comparatively much more expensive than its equivalents in the state of the art. This is both because of the intrinsic cost price of each coupling agent used, and also because of the cost associated with the use of such additives making the fabrication process more complex.

OBJECTS AND SUMMARY OF THE INVENTION

Thus, the technical problem to be solved by the subject matter of the present invention is to propose a liquid silicone elastomer composition comprising an unsaturated polyorganosiloxane having at least two unsaturated bonds, a hydrogenopolyorganosiloxane having at least two silicon-hydrogen bonds, a hydrosilylation catalyst, and silica, which composition enables the problems of the state of the art to be avoided by providing significantly improved tear strength, while benefiting from complete compatibility with the injection-molding process in the state of the art, preserving electrical properties, and keeping down cost price.

According to the present invention, a solution to the technical problem posed consists in the liquid silicone elastomer composition further comprising an unsaturated organic polymer having at least two unsaturated bonds, together with a cross-linking agent specific to said unsaturated organic polymer.

It results from the above that a composition in accordance with the invention needs to contain at least one unsaturated polyorganosiloxane as defined above, at least one hydrogenopolyorganosiloxane, at least one hydrosilylation catalyst, at least one type of silica, at least one unsaturated organic polymer having at least two unsaturated bonds, and at least one cross-linking agent specific to said unsaturated organic polymer. However that also means, implicitly, that the composition may include a plurality of unsaturated polyorganosiloxanes, and/or a plurality of hydrogenopolyorganosiloxanes, and/or a plurality of hydrosilylation catalysts, and/or a plurality of different types of silica, and/or a plurality of unsaturated organic polymers, and/or a plurality of specific cross-linking agents.

It should be observed that throughout this specification, the term "organic polymer" designates any hydrocarbon macromolecule in which the main backbone is made up essentially of carbon atoms. This implies that the polymers having main chains based on atoms other than carbon, i.e. inorganic polymers, are not concerned. This applies in particular to polyorganosiloxanes which are polymers built up from chains of silicon and oxygen atoms constituting the main backbone.

It can be specified that each unsaturated bond in the unsaturated polyorganosiloxane and the unsaturated organic polymer may be constituted equally well by a double bond or a triple bond. Each unsaturated bond may also equally well be of the carbon-carbon, carbon-oxygen, carbon-nitrogen, nitrogen-nitrogen, or nitrogen-oxygen type. Each unsaturated bond may also equally well either be of the side chain type or it may be in the end position, or it may be directly integrated in the middle of the chain.

In any event, the invention as defined in this way presents the advantage of being capable of increasing the tear strength of a silicone material, merely by adding an unsaturated organic polymer and a cross-linking agent specific to the base composition. Unlike the prior art, the fact of using this specific type of polymer makes it possible to avoid adding any coupling agent. The unsaturated organic polymer must be considered as a reinforcing polymer.

The improvement in the tear strength comes from the structural non-uniformity of the material that results from cross-linking a composition in accordance with the invention. The tear strength of a material is associated with its ability to withstand crack propagation. Thus, tear strength can be improved by any factor that serves to dissipate energy. Adding fillers within the silicone material is one of the ways used for dissipating energy.

Concretely, in the invention, dispersing an unsaturated organic polymer associated with a specific cross-linking agent within a silicone matrix serves to create non-uniformities in the form of nodules. After cross-linking, these nodules act as a reinforcing filler in the matrix. Two main phenomena associated with the presence of this type of filler contribute to reinforcing the material. Firstly there is a phenomenon of the tip of a crack being blunted or dulled, which amounts to reducing energy density. Secondly there is a phenomenon of crack deflection, the filler constituting a barrier capable of changing the propagation direction of said crack, thus advantageously decreasing the energy of propagation.

The presence of the specific cross-linking agent serves to guarantee that the reinforcing polymer is cross-linked within the silicone matrix, whatever the interactivity between said polymer and the hydrogenopolyorganosiloxane, i.e. the cross-linking agent of the unsaturated polyorganosiloxane. Naturally, the concept of cross-linking agent extends to the broad meaning of the term, i.e. it designates in particular any type of known cross-linking initiator, e.g. a peroxide.

The invention also makes it possible to maintain or decrease the viscosity level of the liquid silicone elastomer composition so that it remains entirely compatible with injection-molding techniques, and in particular low pressure injection-molding methods.

The invention also makes it possible to preserve the mechanical and electrical properties of the silicone material.

Finally, the invention does not lead to any extra cost compared with solutions in the state of the art, since implementing the invention requires the use of only two additional compounds that are relatively inexpensive.

According to a feature of the invention, the composition may also include a catalyst that is specific to the reaction of cross-linking the unsaturated organic polymer with its specific cross-linking agent.

In particularly advantageous manner, the unsaturated organic polymer includes at least two pendant type unsaturated bonds, which are positioned along the chain and/or in a terminal position. This type of unsaturation serves to maximize the functionality of the polymer compared with an equivalent macromolecule, but having only double or triple bonds in the middle of the main chain.

Preferably, the unsaturated organic polymer has at least one vinyl group. As specified above, it should be understood that each double vinyl bond can equally well be pendant along the chain or pendant in a terminal position.

According to another feature of the invention, the unsaturated organic polymer presents viscosity lying in the range 0.5 pascal seconds (Pa.s) to 1000 Pa.s. In other words, this means that the polymer, which is for reinforcing the tear strength of the silicone material after the composition has cross-linked, is advantageously in liquid form in the normal state.

It is essential for the final composition not to be too viscous so that it can be worked using traditional techniques, and more particularly using low pressure injection-molding methods.

It is desired to work with unsaturated organic polymers that are liquid, likewise in order to remain within a system of consistency similar to the basic silicone system, of viscosity that generally lies in the range 50 Pa.s to 1000 Pa.s. Under all circumstances, it is preferred to work with unsaturated organic polymers having viscosities that are similar to that of the silicone system, or that are lower. Using a reinforcing polymer that is more fluid than the basic LSR system makes it advantageously possible to adjust and more precisely lower the overall viscosity of the composition.

The unsaturated organic polymer is preferably of the elastomer type. The purpose of this characteristic is to remain in an all-elastomer system, given that silicone is already an elastomer. It should be understood that it may equally well be a natural elastomer or a synthetic elastomer.

According to another feature of the invention, the liquid silicone elastomer composition includes 1 pcr to 10 pcr of unsaturated organic polymer, and preferably 1 pcr to 3 pcr. It should be observed that the quantities are here expressed conventionally in pcr, i.e. in parts by weight per hundred parts of resin.

In any event, it can be seen that the reinforcing polymer is present only in very small quantity within the mixture. This constitutes a significant advantage in terms of cost, but it also greatly facilitates the process of fabricating the composition.

In accordance with another advantageous characteristic of the invention, the unsaturated polyorganosiloxane has at least two pendant type unsaturated bonds, regardless of whether they are positioned along the chain and/or in terminal positions. It should be observed that the reasons, the consequences, and the advantages of such a preferred selection are analogous to those mentioned above when describing the characteristics of the reinforcing polymer.

The same applies concerning the fact that the unsaturated polyorganosiloxane has, in particularly advantageous manner, at least one vinyl group.

According to another feature of the invention, the liquid silicone elastomer composition further includes an inhibitor of the hydrosilylation catalyst. The presence of this compound is to provide control over the hydrosilylation reaction, specifically by inhibiting the catalyst up to a given temperature that corresponds to the decomplexing temperature of the inhibitor, then releasing the effects of said catalyst once said threshold temperature has been exceeded.

The hydrosilylation catalyst is preferably a platinum catalyst. Naturally, any other compound capable of initiating and/or encouraging the hydrosilylation reaction could be used in equivalent manner, without it necessarily being a metal complex.

According to another feature of the invention, the liquid silicone elastomer composition further includes at least one additive selected from the group of reinforcement fillers, conductive fillers, fire-retardant fillers, plasticizers, thermal stabilizers, antioxidants, dyes, and anti-UV agents.

The term "additive" is used herein very generally to designate any compound that is added to the liquid silicone elastomer composition. This thus relates equally well to additives that are incorporated in small doses and that, in principle, have no influence on the final properties of the material, and to fillers that are integrated in much larger doses and that may, a priori, change the final characteristics of said material.

In this context, it should be observed that thermal stabilizers, antioxidants, dyes, and anti-UV agents, are generally considered as being additives, whereas reinforcing fillers, conductive fillers, fire-retardant fillers, and plasticizers are commonly thought of as fillers.

By way of indication, mention can be made of a few examples of fillers that can be added to the polymer mixture. It is possible to use in particular reinforcing fillers such as glass fibers or carbon fibers, pigments such as titanium dioxide or iron oxide, conductive fillers such as carbon black, finely-divided metallic fillers, or zinc oxide, fire-retardant fillers such as halogenated hydrocarbons, alumina trihydrate, or magnesium hydroxide, plasticizers for silicone such as polydimethylsiloxane oils, etc.

In particularly advantageous manner, the composition of the liquid silicone elastomer includes 0.5% to 50% by weight of additive, and preferably 0.5% to 20% by weight.

The invention also provides any electric power accessory including at least one element made from a composition as described above. The term "electric power accessory" is used to mean any device for fitting to a power cable, such as, for example: a termination element or a junction element.

Naturally, the liquid silicone elastomer composition in accordance with the invention may also be used more generally for fabricating any silicone molded part that needs to present high tear strength.

Finally, the invention provides methods of fabrication enabling any liquid silicone elastomer composition as described above to be prepared.

In a presently-preferred first method of the invention, the liquid silicone elastomer composition is prepared by mixing two components comprising respectively at least the hydrogenopolyorganosiloxane and at least the hydrosilylation catalyst. Under such conditions, the unsaturated organic polymer and its specific cross-linking agent are added after the two components in question have been mixed together.

It is important that the hydrogenopolyorganosiloxane and the hydrosilylation catalyst are not both present in the same component, so as to avoid untimely triggering of the hydrosilylation reaction. The unsaturated polyorganosiloxane and the silica can be incorporated in one and/or the other of the components of the mixture.

In practice, the step of incorporating the reinforcing polymer and its specific cross-linking agent to the mixture of the two components is advantageously performed immediately before introducing the entire composition into the mold.

In accordance with the second fabrication method, the liquid silicone elastomer composition is still prepared by mixing two components respectively comprising at least the hydrogenopolyorganosiloxane and at least the hydrosilylation catalyst. However in this method the unsaturated organic polymer and its specific cross-linking agent are integrated respectively with at least one of the two components, prior to mixing together the two components as enriched in this way.

As in the first implementation, the hydrogenopolyorganosiloxane and the hydrosilylation catalyst must not be present in the same component, while the unsaturated polyorganosiloxane and the silica may be incorporated in one and/or the other of the components of the mixture.

This is a much more traditional procedure, in the sense that the reinforcing polymer and its specific cross-linking agent are added upstream from the final mixing step. Final mixing thus takes place conventionally between two components, the special feature coming from the fact that the composition of at least one of said components has previously had the reinforcing polymer and/or the associated specific cross-linking agent added thereto.

The present invention also relates to the characteristics that appear from the description below, and that need to be considered in isolation or in any technically feasible combination.

BRIEF DESCRIPTION OF THE DRAWINGS:

This description, given by way of non-limiting example, is to make it better understood what the invention consists in and how it can be implemented. It is also given with reference to the accompanying drawings, in which.

DETAILED DESCRIPTION:

For reasons of clarity, only elements that are essential for understanding the invention are shown, and this is done diagrammatically and without keeping to scale.

Figure 1:
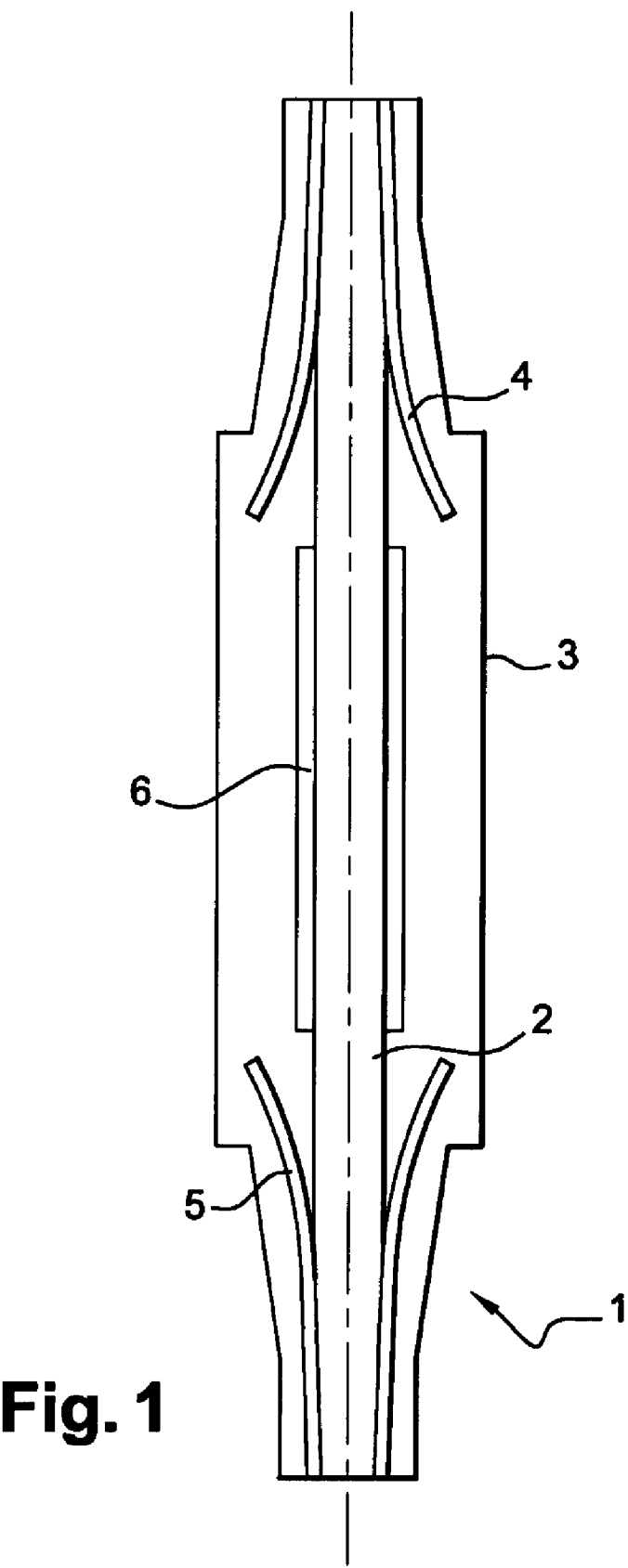
FIG. 1 is a longitudinal section view of a high voltage junction element for power cables.

FIG. 1 shows a junction element 1 for splicing a high voltage cable 2. The junction element 1 is conventionally made up of a junction body 3 containing two semiconductive deflector cones 4 and 5, and also a central semiconductive electrode 6.

The junction body 3 is made of an insulating material obtained by hydrosilylation of a liquid silicone elastomer composition in accordance with the invention. The semiconductive cones 4 and 5 and the central electrode 6 are made of a material identical to that of the junction body 3, with the exception that it is filled with carbon black in order to have semiconductive properties.

Other characteristics and advantages of the present invention appear from the following description of examples, said examples being given by way of non-limiting illustration.

Examples I to III relate to silicone materials for use in making components for electric power accessories. The composition from which they derive are all based on the same LSR system, i.e. a formulation sold under the reference LSR 8540 by the supplier Rhodia.

Table 1 summarizes the main characteristics of the reinforcement polymers added to the basic LSR system in order to constitute samples 1 to 6 of Examples I to III. There can thus be seen the molar mass and the viscosity of various liquid polybutadienes sold under the trademark Ricon by the supplier Cray Valley.

TABLE 1

| Material | Mn × 1000 (g · mol$^{-1}$) | Viscosity (Pa · s) |
| --- | --- | --- |
| Ricon 131 | 4.5 | 2.75 |
| Ricon 153 | 4.7 | 60 |
| Ricon 130MAS | 2.7 | 6.5 |
| Ricon 130MA13 | 2.9 | 17 |

The various samples are all made using the same preparatory procedure. The components A and B of the LSR system were placed in a mixing capsule at a 50:50 ratio by weight. Thereafter, the desired quantity of the reinforcement polymer (Ricon) was added. Mixing was then performed in a mixer in three steps between which the edges of the capsule were scraped with a spatula. Specifically, a first mixing step lasted 30 seconds (s) at 1500 revolutions per minute (rpm), a second mixing step lasted 30 s at 1500 rpm, and a third mixing step lasted 30 s at 2000 rpm; a degassing step lasting 3 minutes (min) was performed at the end of the third mixing step. The mixture made in this way was then cast into a metal mold having dimensions of 2 millimeters (mm)×13 mm×14 mm, and was then placed in a press at the desired temperature and for the selected length of time to obtain a cross-linked plate. Test pieces were then cut from the plate under the conditions set out in ISO standard 34/1.

EXAMPLE I

This relates more particularly to materials obtained from liquid silicone elastomer compositions that were cross-linked for 1 hour (h) at 120° C. Two samples 1 and 2 derived from compositions in accordance with the invention, but having different ingredients, were prepared in order to be compared with a reference 1 lacking in any reinforcement polymer.

The first portion of Table 2 gives the respective proportions of the various ingredients present in the various compositions. The second portion of Table 2 lists the results of tear strength measurements carried out in accordance with the specifications of ISO standard 34-1. In this respect, it should be observed that tear strength was measured on trouser-shaped test pieces using a traction speed of 100 millimeters per minute (mm/min) and that the values given are median values.

TABLE 2

|  | Ref. 1 | Smpl. 1 | Smpl. 2 |
| --- | --- | --- | --- |
| LSR (pcr) | 100 | 100 | 100 |
| Ricon 131 (pcr) | 0 | 1 | 0 |
| Ricon 130MA13 (pcr) | 0 | 0 | 1 |
| Tear strength (N/mm) | 4.5 | 7.8 | 7 |

It can be seen above all that the tear strength of a material derived from a liquid silicone elastomer composition is significantly greater than that of a material made from a composition having no reinforcement polymer, regardless of the nature of the reinforcement polymer present.

EXAMPLE II

This relates more particularly to materials having compositions that were cross-linked for 1 h20 at 140° C. A single sample 3 derived from a composition in accordance with the invention was prepared in order to be compared with a reference 2 having no reinforcement polymer.

As in Example I, the first portion of Table 3 gives the respective proportions of the various ingredients present in the various compositions, while the second portion lists the results of tear strength measurements carried out likewise in accordance with the specifications of ISO standard 34-1.

TABLE 3

|  | Ref. 2 | Smpl. 3 |
| --- | --- | --- |
| LSR (pcr) | 100 | 100 |
| Ricon 131 (pcr) | 0 | 2 |
| Tear strength (N/mm) | 5.8 | 9.5 |

Figure 2:
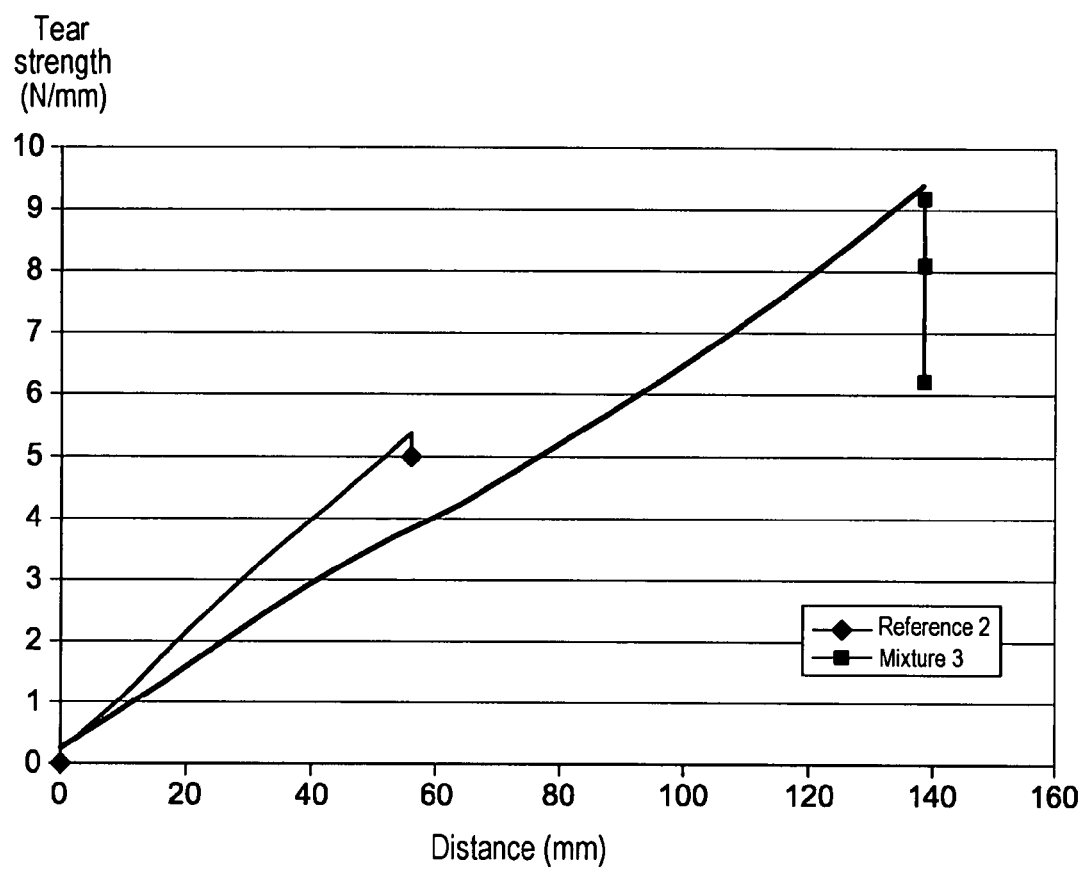
FIG. 2 plots tear strength curves.

Here again it can be seen that a material derived from a composition in accordance with the invention presents tear strength that is very clearly greater than that of a material made from a composition have no reinforcement polymer (FIG. 2).

Compared with the measurements made in the context of Example I, it can also be seen that the fact of carrying out cross-linking for a longer period of time and at a higher temperature led to a significant improvement in the tear strength to the silicone material.

EXAMPLE III

This related more particularly to materials that were made by cross-linking liquid silicone elastomer compositions for 1 h at 120° C. and then proceeding with annealing for 8 h at 150° C. Three samples 4 to 6 derived from compositions in accordance with the invention, but having different ingredients, were prepared in order to be compared with a reference 3 that had no reinforcement polymer.

The remarks concerning the structure of Table 4 are identical to those made above for Tables 2 and 3.

TABLE 4

|  | Ref. 3 | Smpl. 4 | Smpl. 5 | Smpl. 6 |
| --- | --- | --- | --- | --- |
| LSR (pcr) | 100 | 100 | 100 | 100 |
| Ricon 130MA8 (pcr) | 0 | 3 | 0 | 0 |
| Ricon 130MA13 (pcr) | 0 | 0 | 3 | 0 |
| Ricon 153 (pcr) | 0 | 0 | 0 | 1 |
| Tear strength (N/mm) | 4.5 | 7.6 | 6.4 | 7.6 |

Once again, it can be seen that materials derived from compositions in accordance with the invention provide better tear strength.

However it can also be seen that such performance can be obtained by using a very small quantity of reinforcement polymer, by appropriately selecting the nature of said reinforcement polymer.

The invention claimed is:

1. An electric power accessory comprising:
   at least one power cable accessory element, for fitting to a power cable, made from a liquid silicone elastomer composition having:
   an unsaturated polyorganosiloxane having at least two unsaturated bonds;
   a hydrogenopolyorganosiloxane having at least two silicon-hydrogen bonds;
   a hydrosilylation catalyst; and
   silica,
   wherein said composition further comprises a liquid unsaturated organic polymer having at least two unsaturated bonds, and a cross-linking agent specific to said unsaturated organic polymer, wherein the specific cross-linking agent is a peroxide.

2. The electric power accessory according to claim 1, wherein the unsaturated organic polymer has at least two pendant type unsaturated bonds.

3. The electric power accessory according to claim 1, wherein the unsaturated organic polymer includes at least one vinyl group.

4. The electric power accessory according to claim 1, wherein the unsaturated organic polymer is an elastomer.

5. The electric power accessory according to claim 1, wherein said electric power accessory includes 1 to 10 parts by weight of unsaturated organic polymer.

6. The electric power accessory according to claim 1, wherein the unsaturated polyorganosiloxane includes at least two pendant unsaturated bonds.

7. The electric power accessory according to claim 1, wherein the unsaturated polyorganosiloxane includes at least one vinyl group.

8. The electric power accessory according to claim 1, wherein said electric power accessory further includes an inhibitor of the hydrosilylation catalyst.

9. The electric power accessory according to claim 1, wherein the hydrosilylation catalyst is a platinum catalyst.

10. The electric power accessory according to claim 1, wherein said electric power accessory further includes at least one additive selected from the group consisting of: reinforcement fillers; conductive fillers; fire-retardant fillers; plasticizers; thermal stabilizers; antioxidants; dyes; and anti-UV agents.

11. The electric power accessory according to claim 10, wherein said electric power accessory includes 0.5% to 50% by weight of additives.

12. A method of fabricating a power accessory element from a liquid silicone elastomer composition in accordance with claim 1, said method comprising the steps of:
mixing together two components respectively having at least the hydrogenopolyorganosiloxane and at least the hydrosilytation catalyst, and in that the unsaturated organic polymer and its specific cross-linking agent are added after said components have been mixed together.

13. A method of fabricating a power accessory element from a liquid silicone elastomer composition in accordance with claim 1, said method comprising the steps of:
mixing together two components respectively having at least the hydrogenopolyorganosiloxane and at least the hydrosilyiation catalyst, and in that the unsaturated organic polymer and the specific cross-linking agent are integrated respectively in at least one of the two components, prior to mixing said components together.

14. The electric power accessory according to claim 5, wherein said electric power accessory includes 1 to 3 parts by weight of unsaturated organic polymer.

15. The electric power accessory according to claim 11, wherein said electric power accessory includes 0.5% to 20% by weight of additives.

16. An electric power accessory comprising:
at least one power cable fitting element made from a liquid silicone elastomer composition having:
an unsaturated polyorganosiloxane having at least two unsaturated bonds;
a hydrogenopolyorganosiloxane having at least two silicon-hydrogen bonds;
a hydrosilylation catalyst; and
silica,
wherein said composition, further comprises a liquid unsaturated organic polymer having at least two unsaturated bonds, and a cross-linking agent exclusive to said unsaturated organic polymer only, such that said unsaturated organic polymer associated with said specific cross-linking agent, after cross-linking, creates nodules as a reinforcing filler.

17. An electric power accessory comprising:
at least one power cable fitting element made from a liquid silicone elastomer composition having:
an unsaturated polyorganosiloxane having at least two unsaturated bonds;
a hydrogenopolyorganosiloxane having at least two silicon-hydrogen bonds;
a hydrosilylation catalyst; and
silica,
wherein said composition further comprises a liquid unsaturated organic polymer having at least two unsaturated bonds, a cross-linking agent specific to said unsaturated organic polymer said specific cross-linking agent being different than said hydrogenopolyorganosiloxane.

18. An electric power accessory according to claim 16, wherein the specific cross-linking agent is a peroxide.

19. The electric power accessory according to claim 5, wherein said electric power accessory includes 1 to 3 parts by weight of unsaturated organic polymer.

20. The electric power accessory according to claim 11, wherein said electric power accessory includes 0.5% to 20% by weight of additives.

21. The electric power accessory according to claim 17, wherein said electric power accessory comprises 1 to 10 parts by weight of said liquid unsaturated organic polymer, 22. The electric power accessory according to claim 17, wherein said electric power accessory comprises 1 to 3 parts by weight of said liquid unsaturated organic polymer.

23. The electric power accessory according to claim 17, wherein the cross-linking agent specific to said unsaturated organic polymer is selected so that it serves to guarantee that a reinforcing polymer is cross-linked within a silicone matrix, whatever the interactivity between said unsaturated organic polymer and the hydrogenopolyorganosiloxane.

24. The electric power accessory according to claim 17, wherein said electric power accessory is a termination element.

25. The electric power accessory according to claim 17, wherein said electric power accessory is a junction element.

26. The electric power accessory according to claim 17, wherein said liquid unsaturated organic polymer is a liquid polybutadiene.

* * * * *